US006455129B1

(12) United States Patent
Kershaw et al.

(10) Patent No.: US 6,455,129 B1
(45) Date of Patent: Sep. 24, 2002

(54) SINGLE-PLY EMBOSSED ABSORBENT PAPER PRODUCTS

(75) Inventors: Thomas N. Kershaw, Neenah; Dale T. Gracyalny, Appleton, both of WI (US)

(73) Assignee: Fort James Corporation, Deerfield, IL (US)

( * ) Notice: Subject to any disclaimer, the term of this patent is extended or adjusted under 35 U.S.C. 154(b) by 97 days.

(21) Appl. No.: 09/709,185

(22) Filed: Nov. 9, 2000

Related U.S. Application Data

(60) Provisional application No. 60/165,080, filed on Nov. 12, 1999.

(51) Int. Cl.7 .............................. B32B 3/00; B31F 1/12; D21H 11/00

(52) U.S. Cl. ....................... 428/156; 428/153; 428/182; 162/111; 162/113; 156/205; 156/209

(58) Field of Search ................................ 428/153, 156, 428/182, 212; 162/109, 111, 112, 113, 281, 282; 156/196, 200, 205, 209

(56) References Cited

U.S. PATENT DOCUMENTS

| | | | | |
|---|---|---|---|---|
| 4,803,032 A | * | 2/1989 | Schulz | 156/209 |
| 5,093,068 A | * | 3/1992 | Schulz | 156/152 |
| 5,328,565 A | | 7/1994 | Rasch et al. | 162/113 |
| 5,656,134 A | | 8/1997 | Marinack et al. | 162/281 |
| 5,885,415 A | | 3/1999 | Marinack et al. | 162/111 |

FOREIGN PATENT DOCUMENTS

| | | | |
|---|---|---|---|
| EP | 0 806 520 A2 | 11/1997 | D21F/11/00 |
| WO | WO 96/18771 | 6/1996 | D21H/27/40 |

* cited by examiner

*Primary Examiner*—Donald J. Loney
(74) *Attorney, Agent, or Firm*—Michael W. Ferrell

(57) ABSTRACT

The invention relates to embossing single-ply paper products, for example, paper towels, tissue and napkins, in which an improved embossing arrangement is used which is particularly suitable for paper products which have been processed so as to impart undulations whose axes extend in a principal undulatory direction, typically in the machine direction. The absorbent sheet typically further includes undulations which extend in the cross (transverse direction) of the web such that the absorbent sheet has a biaxially undulatory structure. The undulations may be formed by the use of an undulatory creping blade. Defined parameters accommodate: the distance at which the undulations are spaced, the total surface area of the design (embossing) elements, the width and length of the embossing elements and the aspect ratio of the elements, as well as the angular orientation of the embossing elements with respect to the undulations.

85 Claims, 10 Drawing Sheets

SINGLE-PLY EMBOSSED ABSORBENT PAPER PRODUCTS

CLAIM FOR PRIORITY

This application claims the benefit of the filing date of U.S. Provisional Patent Application Ser. No. 60/165,080, filed Nov. 12, 1999.

TECHNICAL FIELD

The invention relates to embossed absorbent paper products, for example, paper towels, tissue and napkins, in which an improved embossing arrangement is used which is particularly suitable for embossing single-ply paper products which have been processed so as to include undulations in the sheet.

BACKGROUND OF THE INVENTION

Absorbent paper products, such as paper towels, napkins and toilet tissue are widely used on a daily basis for a variety of household needs. These products are commonly produced by depositing cellulosic fibers suspended in water on a moving foraminous support to form a nascent web, removing water from the nascent web, adhering the dewatered web to a heated cylindrical Yankee dryer, and then removing the web from the Yankee with a creping blade which, in conventional processes, imparts crepe bars, ridges or undulations whose axes extend generally transversely across the sheet (the cross-direction). Products produced in this conventional fashion may often be considered lacking in bulk, appearance and softness and so require additional processing after creping, particularly when produced using conventional wet pressing technology. Absorbent sheet produced using the through air drying techniques normally have sufficient bulk but may have an unattractive appearance or undesirable stiffness.

To overcome these deficiencies, an overall pattern is imparted to the web during the forming and drying process by use of a patterned fabric having designs to enhance appearance. Further, through air dried tissues can be deficient in surface smoothness and softness unless strategies such as calendering, embossing, chemical softeners and stratification of low coarseness fibers on the tissue's outer layers are employed in addition to creping.

Conventional absorbent paper products produced by wet pressing are almost universally subjected to various post-processing treatments after creping to impart softness and bulk. Commonly such tissues are subjected to various combinations of both calendering and embossing to bring the softness and bulk parameters into acceptable ranges for premium quality products. Calendering adversely affects bulk and may raise tensile modulus, which is inversely related to tissue softness. Embossing increases product caliper (bulk) and can reduce modulus, but lowers strength and can have a deleterious effect on surface softness. Accordingly, it can be appreciated that these processes can have adverse effects on strength, appearance, surface smoothness and particularly thickness perception since there is a fundamental conflict between bulk and calendering.

In U.S. Pat. Nos. 5,656,134; 5,685,954; and 5,885,415 to Marinack et al. (hereinafter the Marinack et al. patents), the disclosure of which is incorporated by reference as if fully set forth herein) it was shown that paper products having highly desirable bulk, appearance (including reflectivity) and softness characteristics, can be produced by a process similar to conventional processes, particularly conventional wet pressing, by replacing the conventional creping blade with an undulatory creping blade having a multiplicity of serrulated creping sections presenting differentiated creping and rake angles to the sheet. Further, in addition to imparting desirable initial characteristics directly to the sheet, the process of the Marinack et al. patents produces a sheet which is more capable of withstanding calendering without excessive degradation than a conventional wet pressed tissue web.

Accordingly, using a creping technique it is possible to achieve overall processes which are more forgiving and flexible than conventional existing processes. In particular, the processes of Marinack et al. can be used to provide not only desirable premium products including high softness tissues and towels having surprisingly high strength accompanied by high bulk and absorbency, but also to provide surprising combinations of bulk, strength and absorbency which are desirable for lower grade commercial products. For example, in commercial (away-from-home) toweling, it is usually considered important to put quite a long length of toweling on a relatively small diameter roll. In the past, this has severely restricted the absorbency of these commercial toweling products as absorbency suffered severely from the processing used to produce toweling having limited bulk, or more precisely, the processing used to increase absorbency also increased bulk to a degree which was detrimental to the intended application.

The process and apparatus of the Marinack et al. patents makes it possible to achieve surprisingly high absorbency in a relatively non-bulky towel thus providing an important new benefit to this market segment. Similarly, many webs of the present invention can be calendered more heavily than many conventional webs while still retaining bulk and absorbency, making it possible to provide smoother, and thereby softer feeling, surfaces without unduly increasing tensile modulus or unduly degrading bulk. On the other hand, if the primary goal is to save on the cost of raw materials, the tissue of the present invention can have surprising bulk at a low basis weight without an excessive sacrifice in strength or at low percent crepe while maintaining high caliper. Accordingly, it can be appreciated that the advantages of the present invention can be manipulated to produce novel products having many combinations of properties which previously were impractical.

The objective of the undulatory creping blade of Marinack et al. is to work the web more effectively than previous creping arrangements. That is, the serrulations of the creping blade operate to contact the web rotating off of the dryer in such a way that a part of the web contacts the tops of the serrulations while other parts of the base sheet contact the valleys, thereby forming undulations in the base sheet. This creping operation effectively breaks up the hydrogen and mechanical bonds which link the cellulosic fibers together, thereby producing a smoother, bulkier and more absorbent sheet, which is well suited for consumer use. Creping in accordance with the Marinack et al. patents creates a machine direction oriented shaped sheet which has higher than normal stretch in directions other than the machine direction, that is, particularly high cross-direction stretch.

While the paper products produced with an undulatory creping blade have commercially desirable properties, additional processing in the form of embossing can further add to the properties and appeal of the products. Such embossing can enhance the bulk, softness and appearance of the products. It has been found that the proper selection of emboss element spacing, distribution and orientation can positively impact on the retention or enhancement of the beneficial properties caused by the creping of the web with an undulatory blade. Conversely, improper selection of the emboss element spacing, distribution and orientation can negatively impact, or cause a complete loss of, the beneficial properties caused by the creping of the web with an undulatory blade.

Undulatory blade creping creates a machine direction oriented shaped sheet which has higher than normal stretch in the directions other than the machine direction. The present invention recognizes and takes this three dimensional sheet shape and stretch into consideration. The application of embossing to the biaxially undulatory sheet is done in a way that the emboss process provides the desired modifications to the sheet with controlled extension and disruption of the localized bonds and fiber shapes imparted by the undulatory blade creping. In order to determine the parameters for embossing for sheets processed with an undulatory creping blade certain test embossings were made: when a relatively large size Quilt emboss was applied to undulatory blade creped base sheets made with a number of different blades (tooth spacings being different) unsatisfactory interference patterns are seen. This is a direct result of the relative spacing of the local shape and cross-direction stretch in the sheet to the spacing of the points of application of the force due to the embossing process. At the other extreme, when a very busy and tight spacing of emboss patterns are applied to undulatory blade creped base sheets, most if not all of, the benefits of the undulatory creping is lost.

In accordance with the present invention there were established parameters for embossing webs that have undulations extending longitudinally along a principal undulatory axis and optionally include secondary undulations which extend in the cross (transverse direction) of the web. The parameters must accommodate: the distance at which the undulations are spaced, the total surface area of the design (embossing) elements, the width and length of the embossing elements and the aspect ratio of the elements, and the angular orientation of the embossing elements with respect to the undulations.

It is an object of the present invention to provide processing to provide single-ply paper products that have improved appearance, bulk and strength.

It is another object of the present invention to provide embossing parameters which are compatible with paper webs that have been produced with an undulatory structure.

The embossing parameters of the present invention are applicable to paper webs having undulations running in either the machine or cross-directions regardless of the means used to apply the undulations to the web.

BRIEF DESCRIPTION OF THE DRAWINGS

For a better understanding of the invention reference is made to the following drawings which are to be taken in conjunction with the detailed description to follow.

DESCRIPTION OF THE PREFERRED EMBODIMENTS

Figure 1:
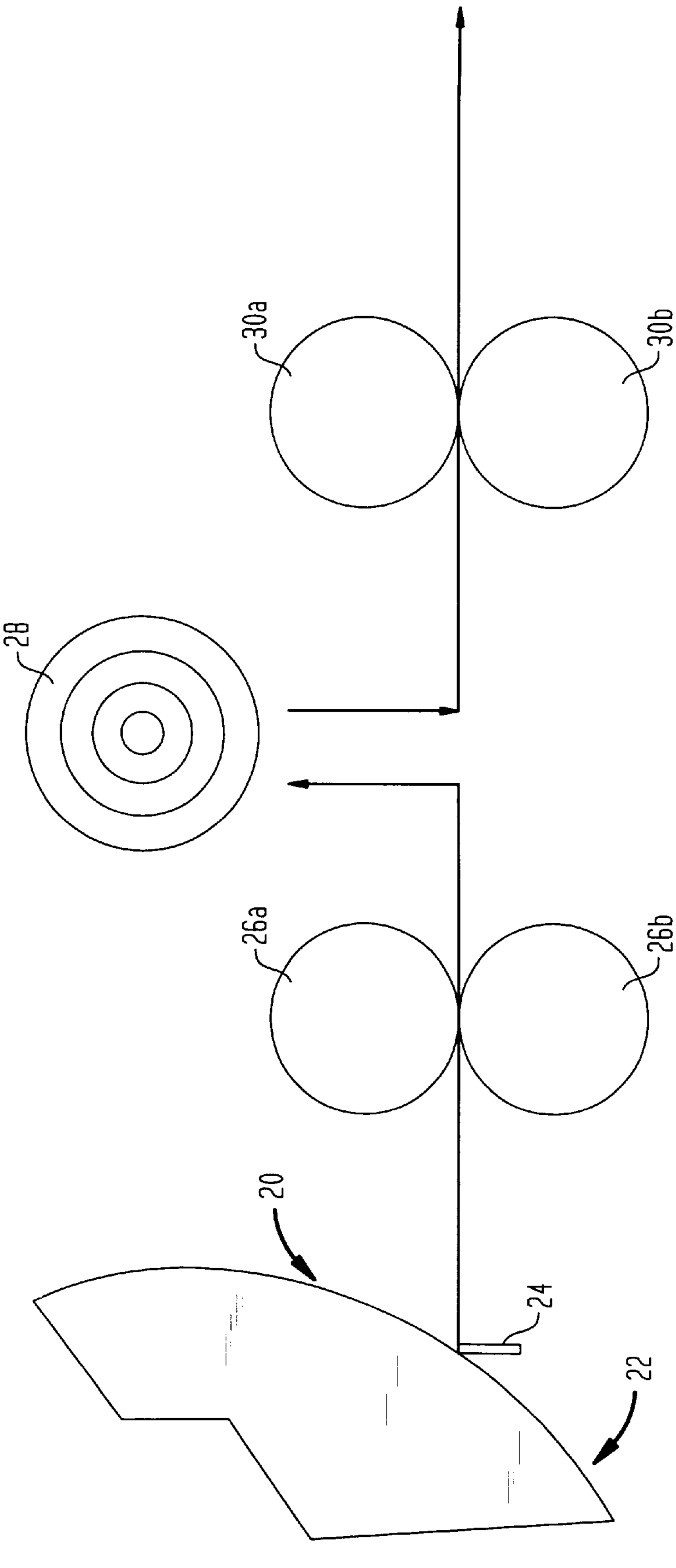
FIG. 1 illustrates schematically the creping, calendering and embossing of the paper web in accordance with the present invention.

The web to be processed according to the present invention can be made using non-recycled and recycled fibers well known to the skilled artisan. Preferred fibers are cellulose based fiber and may include softwood, hardwood, chemical pulp obtained from softwood and/or hardwood by treatment with sulfate or sulfite moieties, mechanical pulp obtained by mechanical treatment of softwood and/or hardwood, recycle fiber, refined fiber and the like. Papermaking fibers used to form the soft absorbent products of the present invention may include cellulosic fibers commonly referred to as wood pulp fibers, liberated in the pulping process from softwood (gymnosperms or coniferous trees) and hardwoods (angiosperms or deciduous trees). The particular tree and pulping process used to liberate the tracheid are not critical to the success of the present invention. Cellulosic fibers from diverse material origins may be used to form the web of the present invention, including nonwoody fibers liberated from sabai grass, rice straw, banana leaves, paper mulberry (i.e. bast fiber), abaca leaves, pineapple leaves, esparto grass leaves, and fibers from the genus hesperalae in the family agavaceae. The recycled fibers used in accordance with the present invention may contain any of the above fiber sources in different percentages and can be useful in the present invention. The furnish may include non-cellulosic components including synthetic fiber if so desired.

Papermaking fibers can be liberated from their source material by any one of the number of chemical pulping processes familiar to the skilled artisan including sulfate, sulfite, polysulfide, soda pulping, etc. The pulp can be bleached if desired by chemical means including the use of chlorine, chlorine dioxide, oxygen, etc. Furthermore, papermaking fibers can be liberated from source material by any one of a number of mechanical/chemical pulping processes familiar to anyone experienced in the art including mechanical pulping, thermomechanical pulping, and chemithermomechanical pulping. The mechanical pulps can be bleached, if one wishes, by a number of familiar bleaching schemes including alkaline peroxide and ozone bleaching.

Fibers for use according to the present invention can be obtained from recycling of pre-and post-consumer paper products. Fiber may be obtained, for example, from the recycling of printers trims and cuttings, including book and clay coated paper, post consumer paper including office and curbside paper recycling and old newspaper. The various collected papers can be recycled using means common to recycled paper industry. The papers may be sorted and graded prior to pulping in conventional low-, mid-, and high-consistency pulpers. In the pulpers the papers are mixed with water and agitated to break the fibers free from the sheet. Chemicals common to the industry may be added in this process to improve the dispersion of the fibers in the slurry and to improve the reduction of contaminants that may be present. Following pulping, the slurry is usually passed through various sizes and types of screens and cleaners to remove the larger solid contaminants while retaining the fibers. It is during this process that such waste contaminants as paper clips and plastic residuals are removed.

The pulp is then generally washed to remove smaller sized contaminants consisting primarily of inks, dyes, fines and ash. This process is generally referred to as deinking. Deinking, in the modern sense, refers to the process of making useful pulp from wastepaper while removing an ever-increasing variety of objectionable, noncellulosic materials. One example of a deinking process by which fiber for use in the present invention can be obtained is called floatation. In this process small air bubbles are introduced into a column of the furnish. As the bubbles rise they tend to attract small particles of dye and ash. Once upon the surface of the column of stock they are skimmed off. At this point the pulp may be relatively clean but is often low in brightness. Paper made from this stock can have a dingy, gray appearance, not suitable for near-premium product forms.

To increase the brightness the furnish (pulp) is often bleached. Bleaching can be accomplished by a number of means including, but not limited to, bleaching with chlorine, hypochlorite, chlorine dioxide, oxygen, peroxide, hydrosulfite, or any other commonly used bleaching agents. The types and amounts of bleaching agents depend a great deal on the nature of the wastepaper being processed and upon the level of desired brightness. Generally speaking, unbleached waste papers can have brightness levels between 60 to 80 on the G.E. brightness scale, depending upon the quality of the paper being recycled. Bleached waste papers can range between the same levels and may extend up to about 90, however, this brightness level is dependent upon the nature of the waste papers used. The particular brightness level selected will likewise depend on the product desired.

The creping process is illustrated in FIG. 1. In the process, a web of single-ply paper tissue sheet 20 is creped from the surface of a Yankee dryer 22 using an undulatory creping blade 24. Creping blade 24 imparts to the sheet undulations which extend in the longitudinal direction (machine direction) in addition to transverse crepe bars as is discussed and illustrated in detail to follow. Optionally, creped sheet 20 may be calendered by passing it through the nip of a pair of calender rolls 26*a* and 26*b* which impart smoothness to the sheet while reducing its thickness. After calendering, the sheet is wound on reel 28. To emboss sheet 20 it is unwound from reel 28 in a converting operation and passed through the nip of a pair of embossing rollers 30*a*, 30*b*. Thereafter sheet 20 proceeds to further process steps such as perforating, cutting the sheet into the widths suitable for end users and winding of same unto tubes.

As long as embossing rollers 30 are capable of carrying out embossing according to the parameters of the present invention, rollers 30 may be of either the matched or unmatched type and can be of either steel or rubber. Matched embossing rollers means that the male embossing elements, carried by one roller, are engraved first and the female elements carried by the other rollers are subsequently made from the male elements, or vice versa, so that both elements are virtually inverse or reciprocal images of each other within the practicalities of manufacturing tolerances. This is in contrast to unmatched embossing rollers in which the male and female embossing elements are not identical in shape, but still are positioned relative to each other in registry such that they engage.

The present invention is applicable to uncreped as well as to both dry and wet creping processes. In a dry creping process, the moisture content of the web when it contacts undulatory creping blade 24 is usually in the range of 2 to 8 percent which permits the web to be calendered and wound on reel 28. In a wet creping process the consistency of the web contacting undulatory creping blade 24 is usually in the range of 40 to 75 percent (solids content). After the creping operation, the drying process is completed by use of one or more heated dryers through which the web is wound. These dryers are used to reduce the water content to its desired final level, usually from 2 to 8 percent. The dried sheet is then optionally calendered and wound on reel 28.

Figure 3:
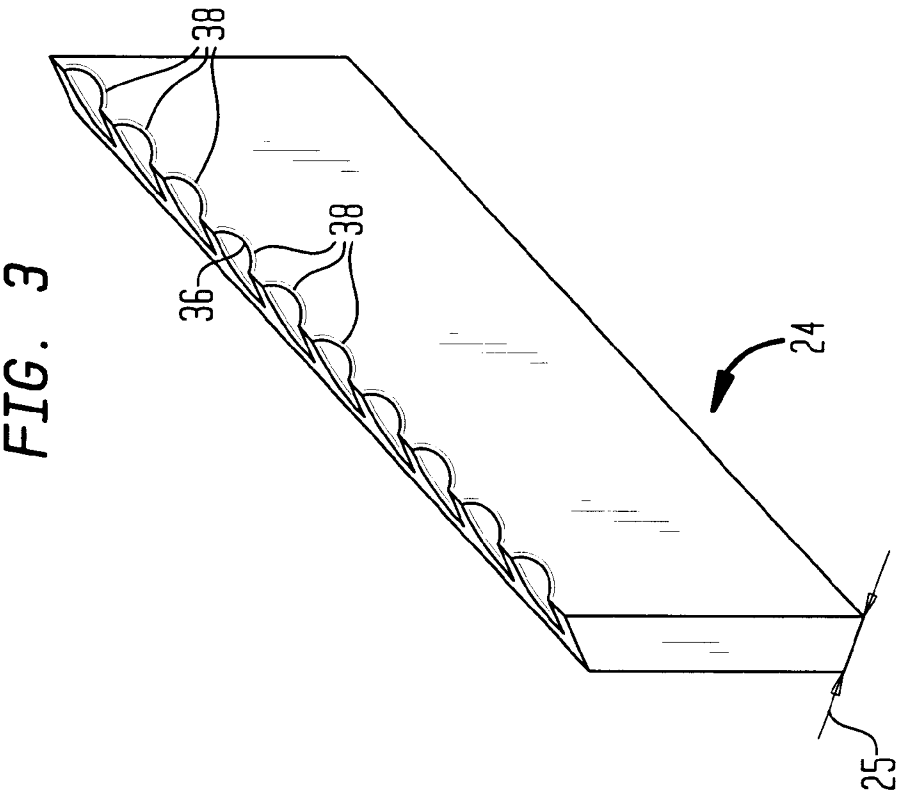
FIGS. 2 and 3 illustrate the front and back of an undulatory creping blade used to crepe the web to be embossed in accordance with the embossing parameters of present invention.
Figure 2:
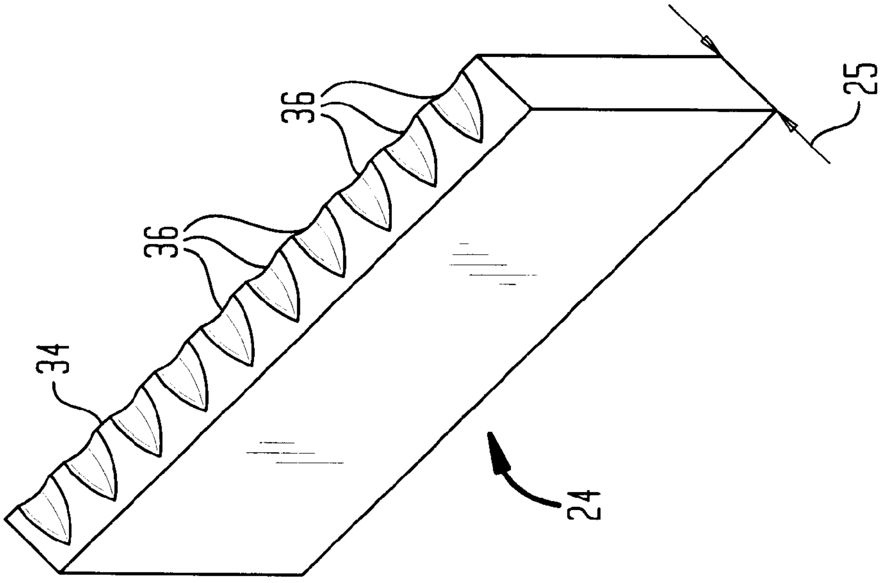

FIGS. 2 and 3 illustrate a portion of undulatory creping blade 24 which extends indefinitely in length, typically exceeding 100 inches in length and often reaching over 26 feet in length to correspond to the thickness of the Yankee dryer on the larger modern paper machines. In contrast, the thickness of blade 24 indicated at 25 is usually on the order of fractions of an inch. As illustrated in FIGS. 2 and 3, an undulatory cutting edge 34 is defined by serrulations 36 disposed along, and formed in, one edge of blade 24 so that an undulatory engagement surface 38, engages Yankee dryer 22 during use. The shape of undulatory cutting edge 34 strongly influences the configuration of the creped web, in that the peaks and valleys of serrulations 36 form undulations in web 20 whose longitudinal axes lies along the machine direction. The number of serrulations 36 can range from 10 to 50 per inch depending upon the desired number of undulations per inch in the finished web.

Figure 4:
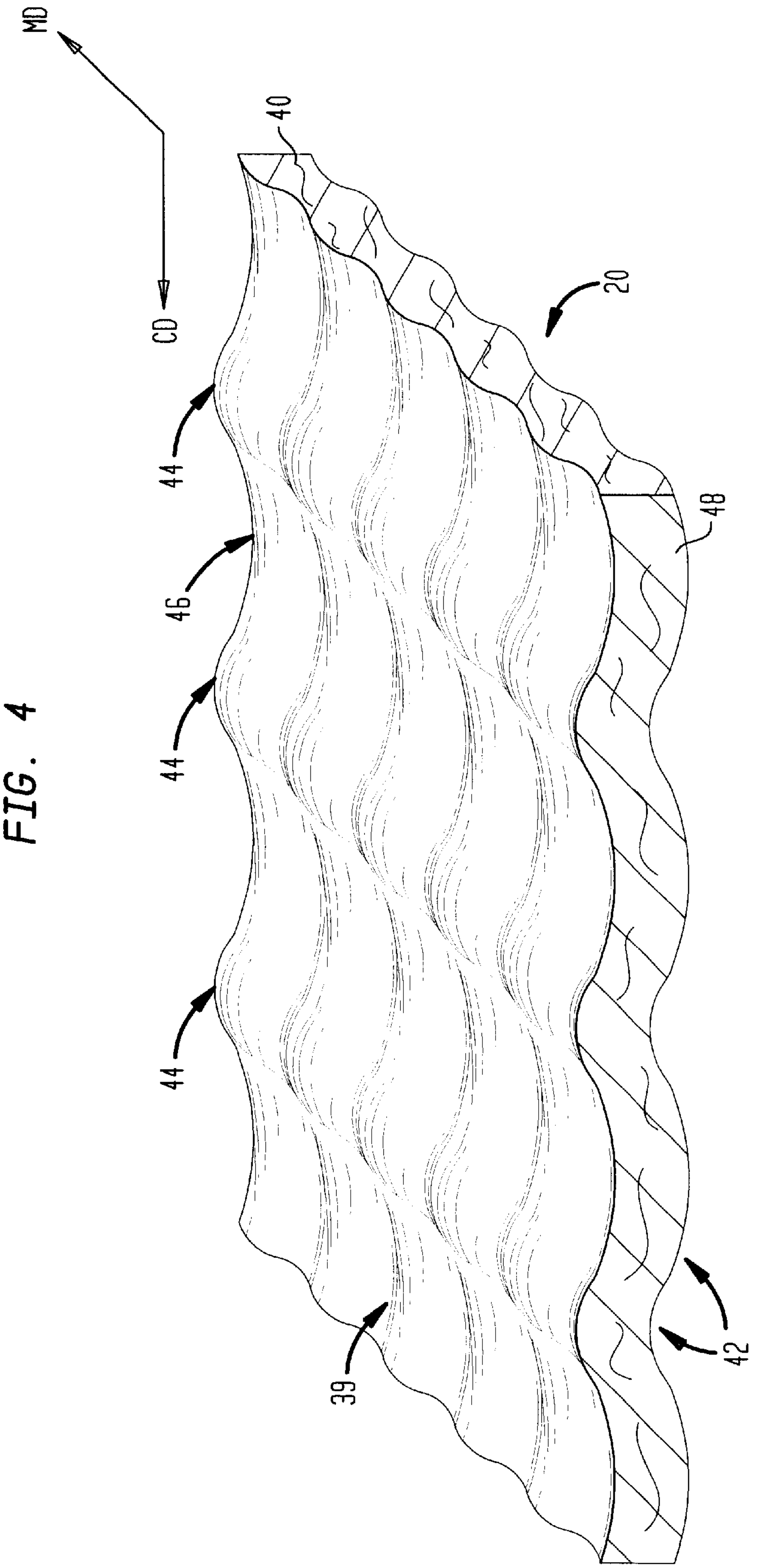
FIG. 4 illustrates the appearance of a biaxially undulatory web that is to be embossed in accordance with the embossing parameters of present invention.

FIG. 4 is a close up illustration of the configuration of web 20 after it has been creped by the action of an undulatory creping blade such as that shown in FIGS. 2 and 3, but before being embossed. Web 20 is characterized by a reticulum of intersecting crepe bars 39 extending transversely in the cross-direction which are formed during the creping of web 20 from Yankee dryer 22. As is seen at right edge shown in FIG. 4, crepe bars 39 form a series of relatively small undulations 40 whose longitudinal axes extend in the cross-direction. The action of serrulations 36 of crepe blade 24 form a series of larger undulations 42 whose longitudinal axes extend in the machine direction, each undulation 42 includes an upwardly disposed portion (peak) 44 and a downwardly disposed portion (valley) 46. As is seen at lower edge 48 shown in FIG. 4, undulations 42 extend in the machine direction and are larger than undulations 40 formed by creped bars 39 extending in the cross-direction. Thus, web 20 has undulations running in both the machine and cross-direction forming a biaxially undulatory web. The present invention provides embossing parameters which enhance the desirable properties of the web shown in FIG. 4. It will be appreciated by one of skill in the art that the absorbent sheet in accordance with the invention may be provided with an undulatory structure or a biaxially undulatory structure such as is shown in FIG. 4 by any suitable technique for making absorbent sheet. One technique, used in both creped and uncreped through-air drying processes involves wet-shaping the web or sheet on a fabric. There is disclosed, for example, a method of forming tissue in U.S. Pat. No. 5,607,551 to Farington, Jr.et al. wherein the functions of providing 4 machine direction stretch and cross machine direction stretch are accomplished by providing a wet end rush transfer and a particular through air drying fabric design respectively. The process according to the '551 patent does not include a Yankee dryer or creping; however, this process may be used to provide undulatory structures useful in connection with the present invention. The disclosure of U.S. Pat. No. 5,607,551 is hereby incorporated by reference. Absorbent sheet with undulatory structures may also be prepared in the absence of wet-end pressing or undulatory creping. There is disclosed, for example, in U.S. Pat. No. 3,994,771 to Morgan, Jr. et al. a sheet provided with an undulatory pattern by knuckling a thermally pre-dried web onto a Yankee dryer followed by creping the sheet off the Yankee dryer. This process may likewise be employed to prepare an undulatory substrate for embossing in accordance with the present invention. The disclosure of U.S. Pat. No. 3,994,771 is hereby incorporated by reference in its entirety into this application.

Figure 5A:
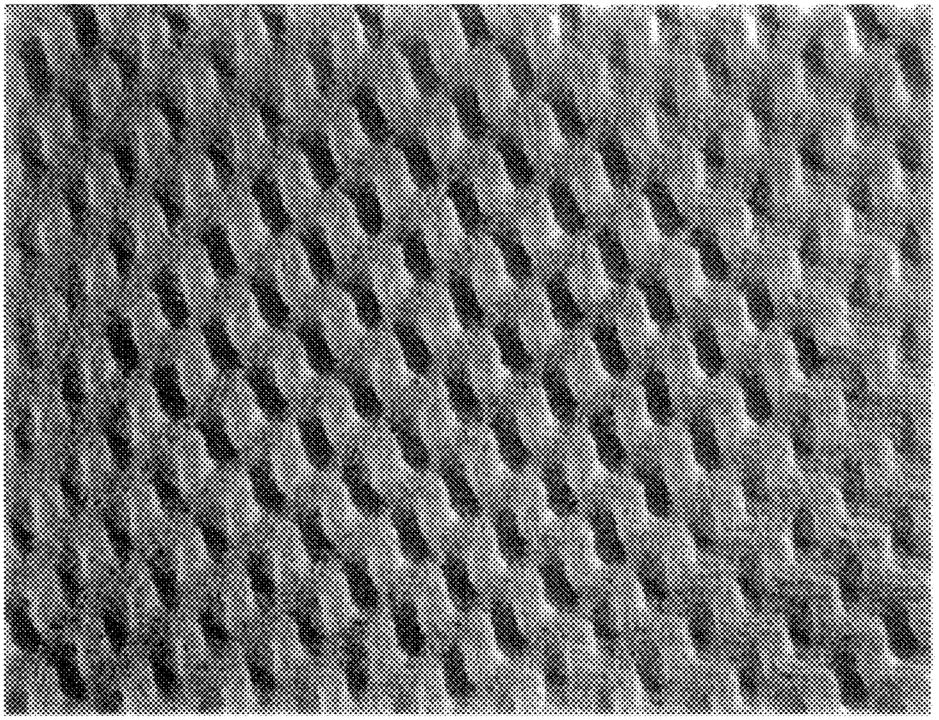
FIG. 5A (PRIOR ART)
FIGS. 5(*a*) and 5(*b*) are photographs of the surface of a conventional absorbent sheet with an emboss pattern, FIG. 5(*a*) is a photograph at 4× magnification, while FIG. 5(*b*) is a photograph at 6× magnification.
Figure 5B:
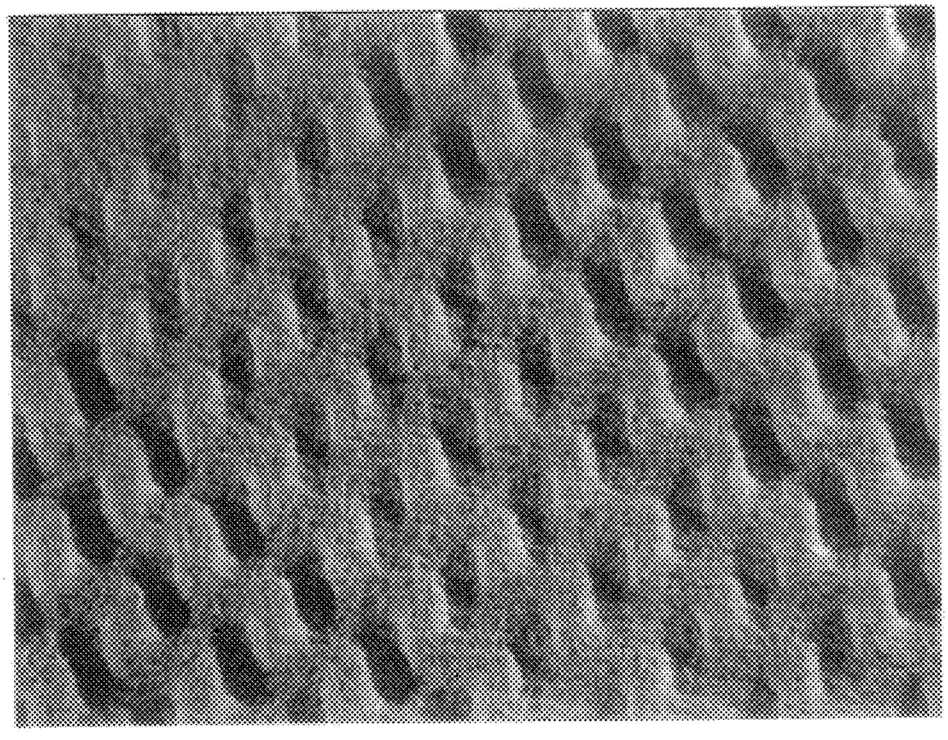
FIG. 5B (PRIOR ART)
Figure 6A:
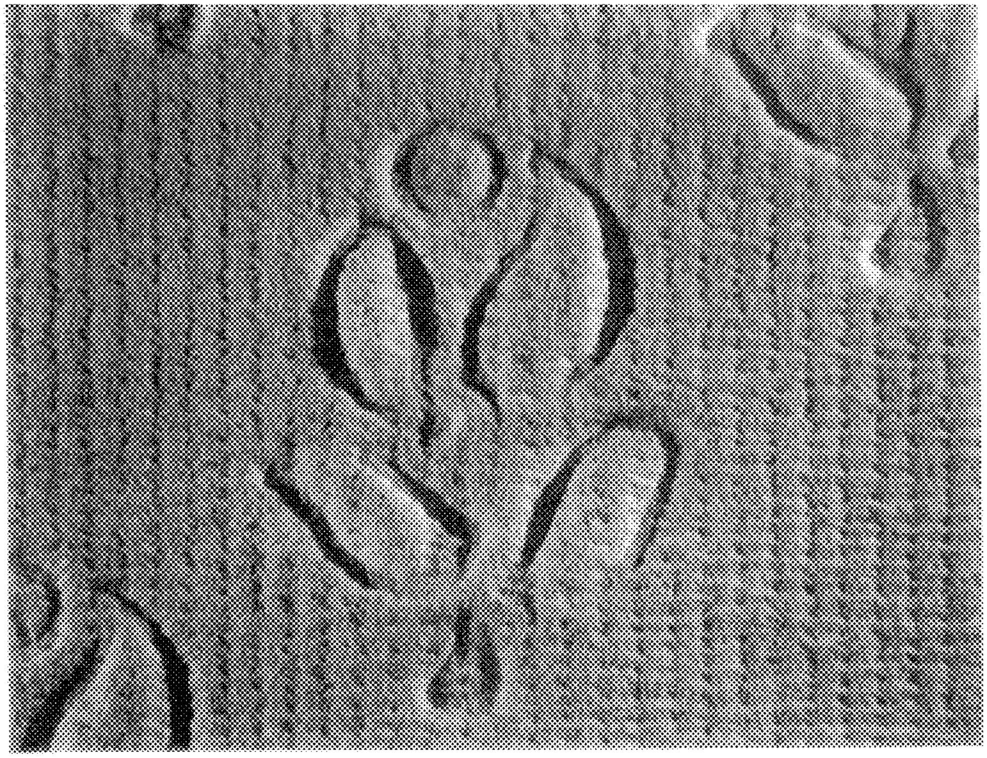
FIGS. 6(*a*) and 6(*b*) are photographs of the surface of an embossed single-ply absorbent sheet produced in accordance with the present invention, FIG. 6(*a*) is a photograph at 4× magnification, while FIG. 6(*b*) is a photograph at 6× magnification.
Figure 6B:
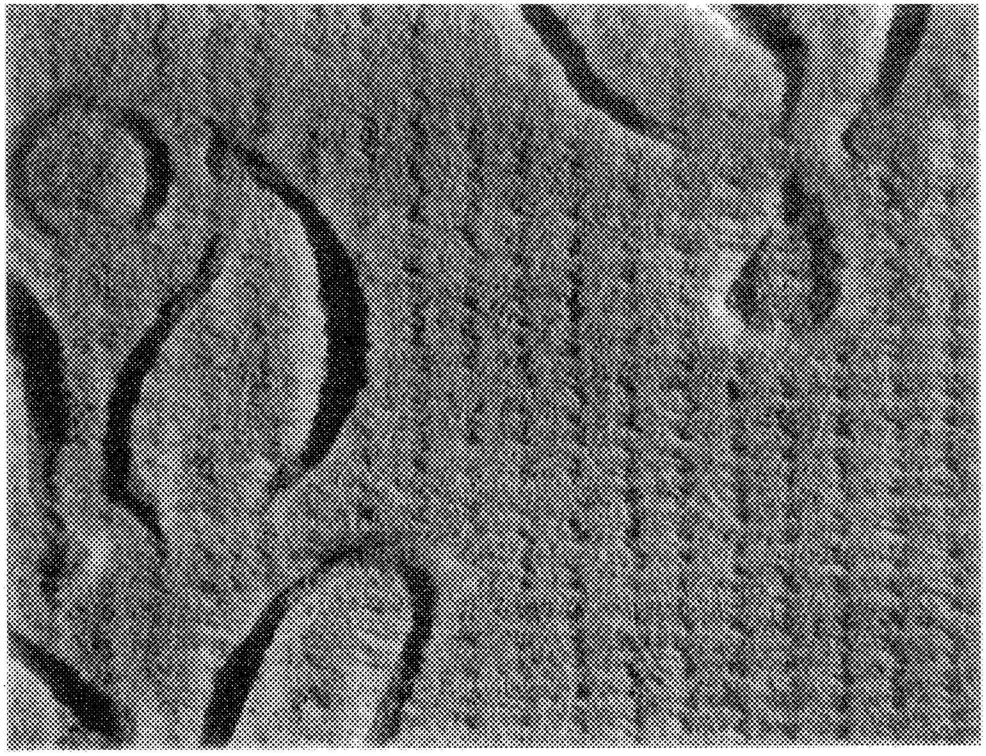

There is shown in FIGS. 5(*a*) and 5(*b*) a conventional absorbent sheet with an emboss pattern. The sheet has a generally smooth finish and does not include undulations extending longitudinally in the machine direction. FIG. 5(*a*) is a photograph at 4× magnification of the surface, while FIG. 5(*b*) is a photograph at 6× magnification of the surface of the sheet. The embossments cover more than about 50 percent of the surface area. In FIGS. 5(*a*) and 5(*b*), the machine direction is the shorter (vertical) direction, while the longer dimension (horizontal) is in the cross-direction of the sheet. FIGS. 6(*a*) through 8(*b*) are similarly oriented as discussed in more detail hereinafter.

There is shown in FIGS. 6(*a*) and 6(*b*) an embossed single-ply absorbent sheet produced in accordance with the present invention. FIG. 6(*a*) is a photograph of a portion of the sheet at 4× magnification, while FIG. 6(*b*) is a photograph of the sheet at 6× magnification. In both cases, the machine direction of the sheet is in the vertical (shorter) direction of the photograph, while the cross-direction of the sheet is in the larger (horizontal) direction. It will be appreciated from the photographs that the sheet has an undulatory structure in the machine direction, crepe bars in the cross-direction, as well as a floral emboss pattern made up of a plurality of design elements.

The design elements of FIGS. 6(*a*) and 6(*b*) can be characterized as follows: there is an upper circular portion having an aspect ratio of approximately 0, thus having an angle with the machine direction of 1; a central stem portion having an aspect ratio of roughly 3, also having an angular relation to the machine direction of 0° and a leaf portion having an aspect ratio of about 1.5, having a characteristic angle with the machine direction of about 25° to about 35°. As will be appreciated from the discussion which follows, the sheet may also be described as having primary undulations extending along a principal undulatory axis of the sheet (in this case the machine direction), as well as having secondary undulations substantially perpendicular to the primary undulations (in this case the cross-direction of the sheet) such that the sheet is biaxially undulatory. This structure is conveniently provided by way of an undulatory creping blade as noted above, but may also be accomplished in connection with wet shaping or fabric molding.

Figure 7A:
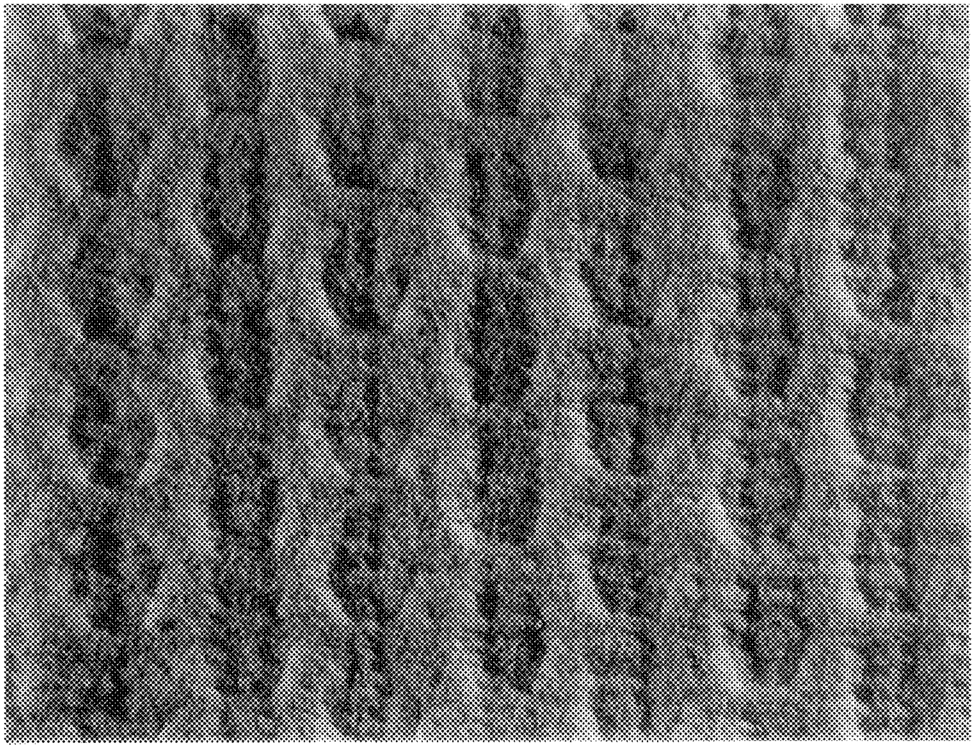
FIGS. 7(*a*) and 7(*b*) are photographs at 6× magnification of the surface of an embossed single-ply absorbent sheet produced in accordance with the present invention, the embossments of FIG. 7(*a*) were produced by steel to steel embossing rollers, while the embossments of FIG. 7(*b*) were produced by steel to rubber embossing rollers.
Figure 7B:
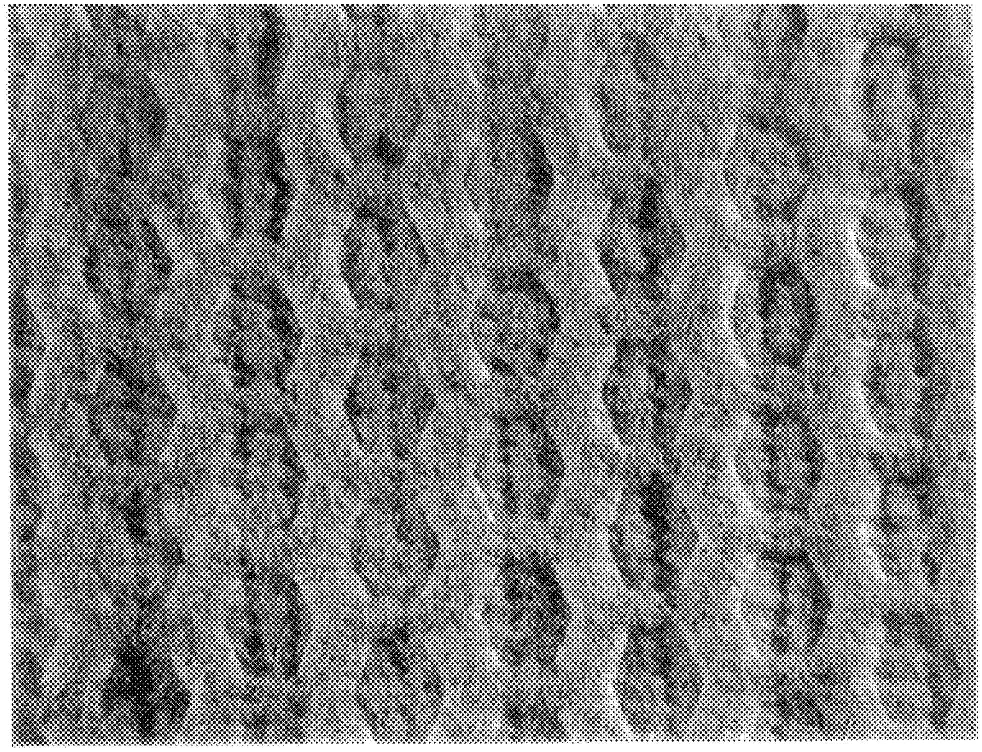

There is shown in FIG. 7(*a*) a photograph of another sheet produced in accordance with the invention, wherein the photograph is at 6× magnification and there is provided a plurality of repeating hexagonal embossments in accordance with the invention. Here again, the machine direction of the sheet is the vertical (shorter) side of the photograph, while the cross-direction of the sheet is the longer (horizontal) side of the photograph. The sheet of FIG. 7(*a*) was produced with matched steel embossing rolls. Two features to note in connection with the sheet of FIG. 7(*a*) are: (1) the embossments have relatively "soft" edges due to local elongation and the longitudinal undulations are offset laterally by the embossments.

Yet another sheet of the present invention is shown in FIG. 7(*b*) which is also a photograph at 6× magnification of a sheet in accordance with the present invention. The machine direction is, here again, in the shorter (vertical) direction of the photograph and the cross-direction is along the longer (or horizontal) side of the photograph, as mounted. The sheet of FIG. 7(*b*) is, in most aspects, similar to the sheet of FIG. 7(*a*); however, the edges of the embossments are sharp. The sheet of FIG. 7(*b*) was made by way of rubber to steel embossing. Here again, the embossments are operative to laterally displace the vertical or machine direction undulations due to movement allowed by cross-direction stretch.

Figure 8A:
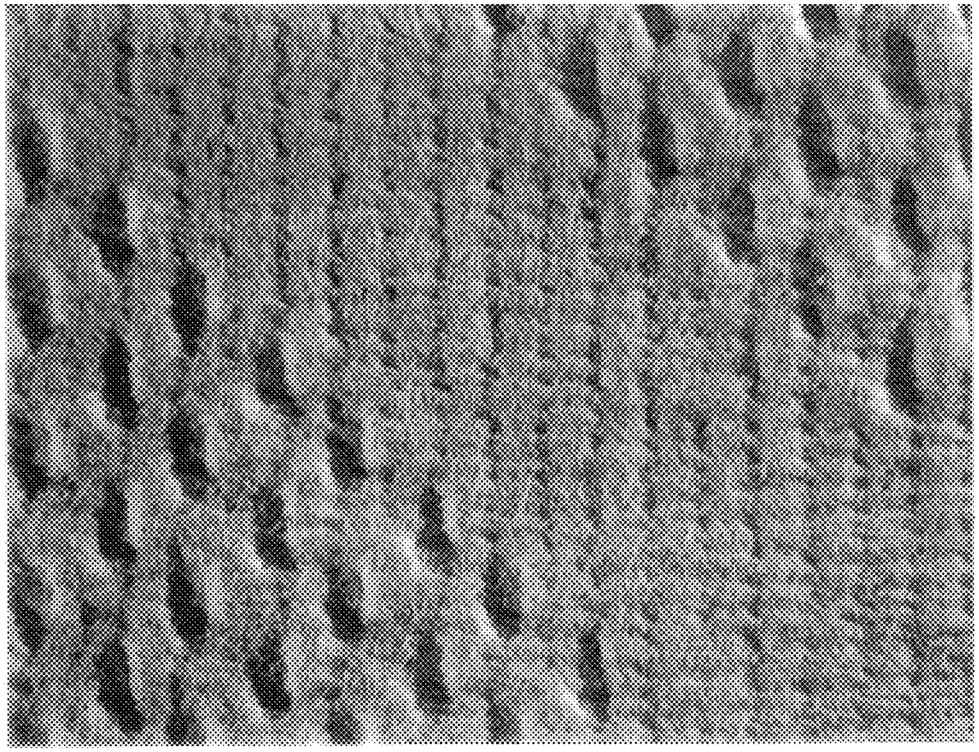
FIGS. 8(*a*) and 8(*b*) are photographs of another absorbent sheet produced in accordance with the present invention, FIG. 8(*a*) is a photograph at 6× magnification, while FIG. 8(*b*) is at 4× magnification.
Figure 8B:
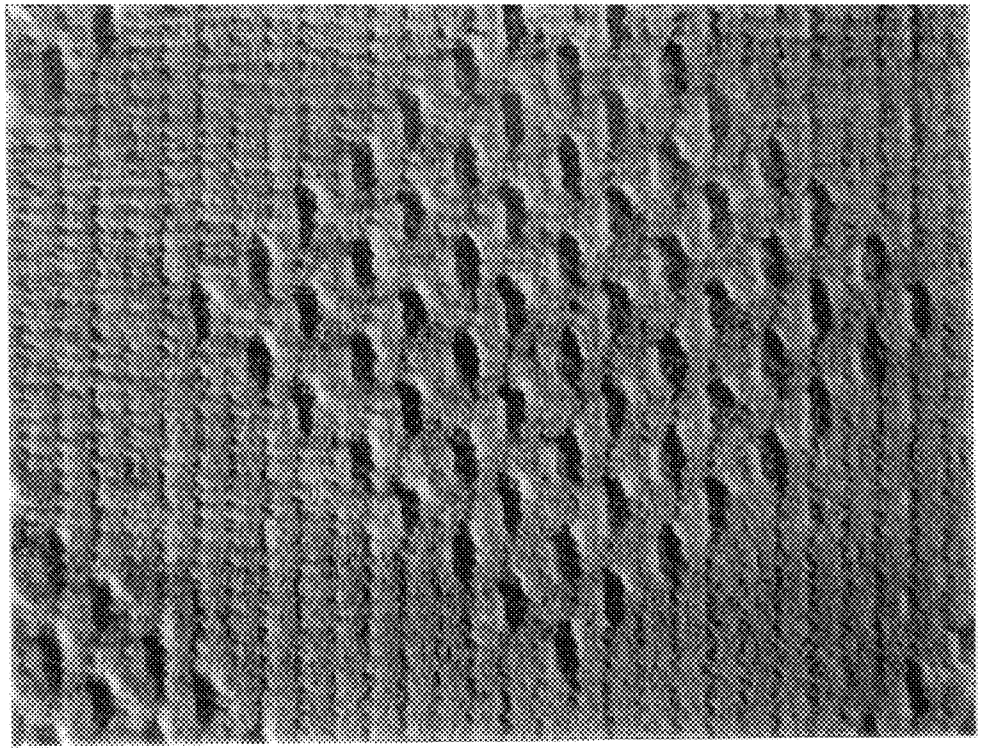

Still yet another absorbent sheet produced in accordance with the present invention appears in the photographs of FIGS. 8(*a*) and 8(*b*). FIG. 8(*a*) is a photograph at 6× magnification, while FIG. 8(*b*) is a photograph of the sheet of FIG. 8(*a*) at 4× magnification. In both cases, the machine direction is along the shorter edge of the photograph, with the cross-direction being perpendicular thereto. The embossments are arranged in a plurality of diamond-like arrays, repeating over the surface of the sheet. The individual embossments have an aspect ratio of about 1.5 and one spaced at a distance of about 1.5 times the separation distance between longitudinal undulations as further described below.

Figure 9:
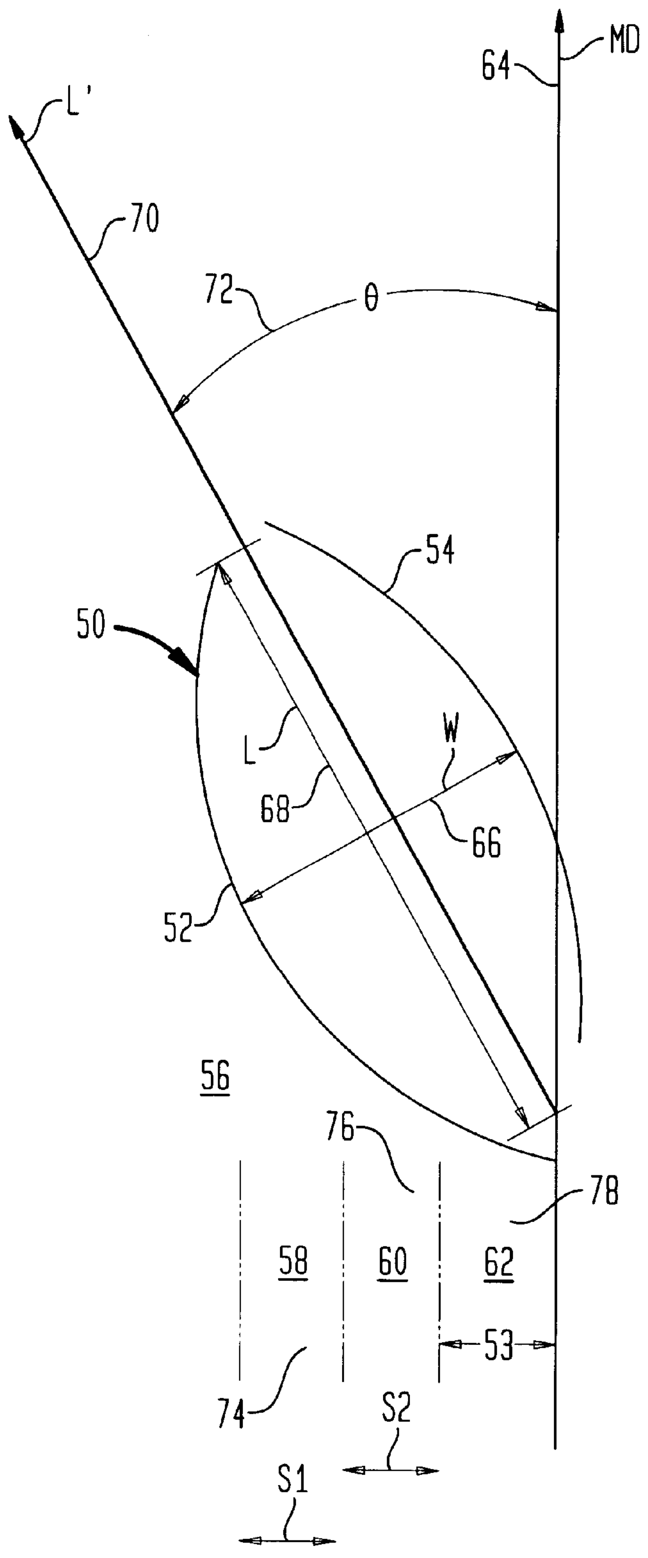
FIG. 9 depicts schematically the orientation of a portion of a floral design embossing element with respect to the undulations of the base sheet.

FIG. 9 depicts schematically a portion of a floral design element 50 such as a petal shown on FIGS. 6(*a*) and 6(*b*) including a first elongate embossment 52 opposing a second elongate embossment 54. The embossments are provided on a base sheet indicated generally at 56 provided with a plurality of undulations 58, 60, 62 which repeat over the surface of sheet 56. The undulations extend in the machine direction 64 of the sheet.

Design element 50 has a characteristic maximum width, 66, also labeled W in the figure and a characteristic maximum length, L, indicated at 68. The aspect ratio, L:W, is characteristically from about 1 to about 4. Length, L, is disposed about a direction, L', indicated at 70 which is at an angle, θ, shown at 72, with the machine direction (MD) 64.

Longitudinal undulations such as undulations 58–62 cover the base sheet in a repeating pattern typically with a frequency of from about 1 to about 50 undulations per inch with from about 12 to about 25 undulations per inch being more typical. The undulations are thus spaced at a plurality of crest to crest distances, S1, S2, S3, indicated at 74, 76, 78 typically in some embodiments at slightly more than a millimeter; 1.5 millimeters or so also being typical. S1, S2 and S3 may be the same in the case of uniform spacing, or may differ if so desired. In the case of non-uniform spacing, the respective distances may be averaged when compared with emboss distances and design element widths.

While embossments 52, 54 may define a design element of an embossing pattern applied in accordance with the present invention, the design elements may also be in the form of embossed shapes, such as hexagons, diamonds, square, ovals, rectangular structures and the like which are uniformly repeating over the surface of the sheet or are provided in clusters. Most preferably, the emboss design elements have an aspect ratio, L:W, greater than 1 and are aligned in the machine direction such that θ is 0.

The invention is further exemplified and described with reference to FIGS. 10 through 12.

Figure 10:
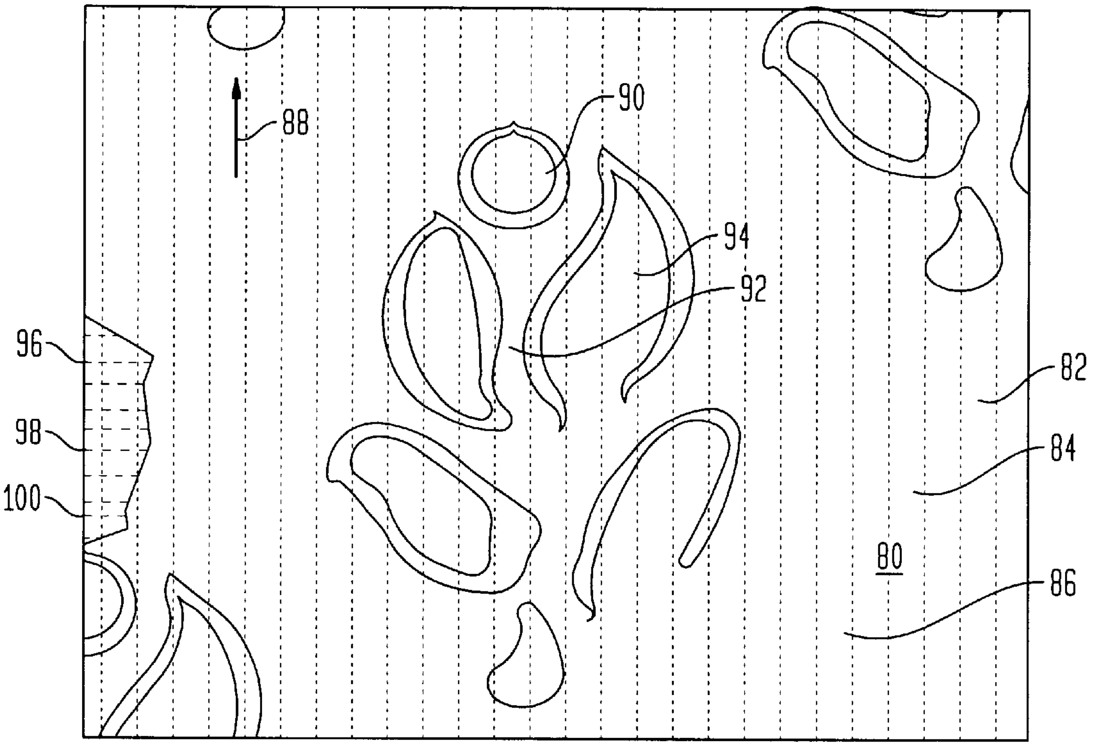
FIG. 10 is a schematic illustration which depicts in detail the embossed sheet of FIGS. 6(*a*) and 6(*b*)

FIG. 10 depicts the embossed sheet of FIGS. 6(*a*) and 6(*b*). The sheet 80 has a plurality of longitudinal undulations 82, 84, 86 and so forth extending in the machine direction 88. A flower design element 90 is essentially circular, having an aspect ratio of 1 and making an angle θ with the machine direction 88 of 0. The central stem design element 92 also extends along the machine direction (θ=0°) and has an aspect ratio of roughly 3. A leaf design element, 94, has an aspect ratio of roughly 1.5 and makes an angle θ with the machine direction of between about 25° and 35°. It should also be noted that sheet 80 is a creped sheet having repeating crepe bars 96, 98, 100 and so forth in the cross-direction. The longitudinal undulations have a frequency of about 20 undulations per inch, while the frequency of the crepe bars is much higher.

Figure 11:
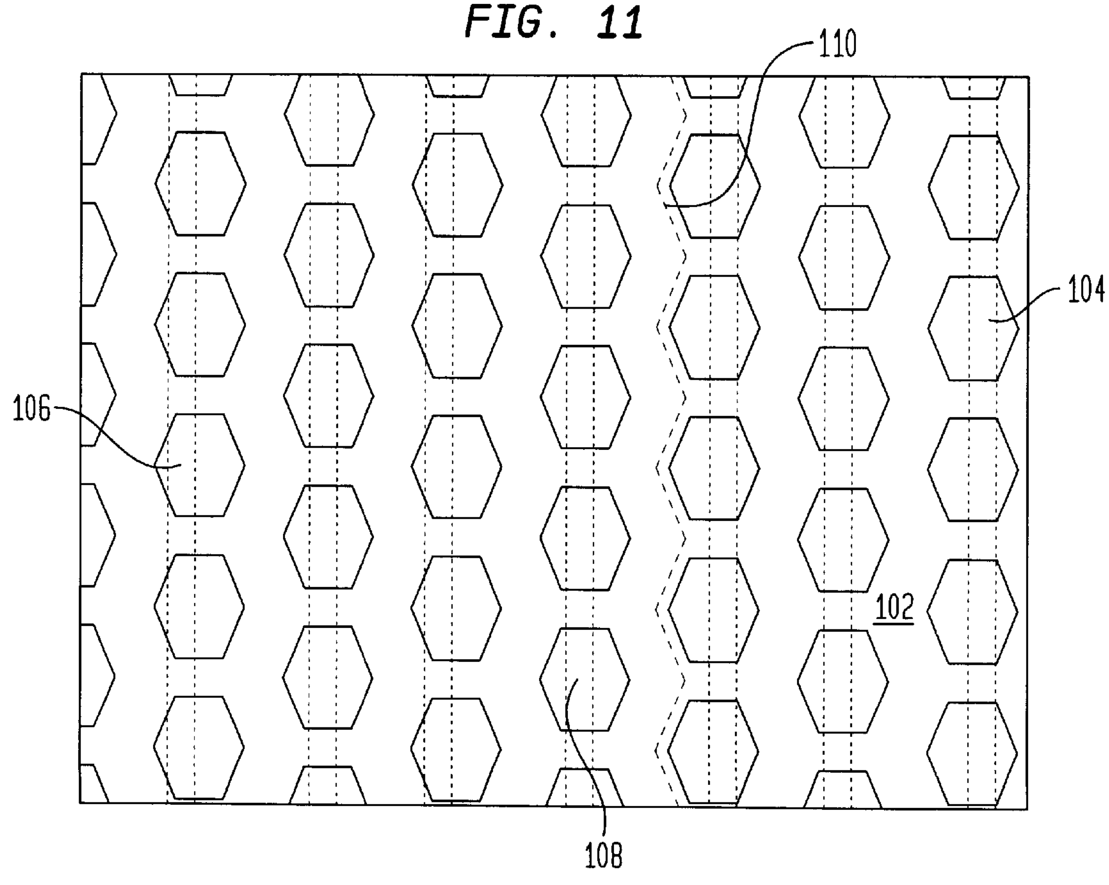
FIG. 11 is a schematic illustration which depicts in detail the embossed sheet of FIGS. 7(*a*) and 7(*b*)

There is shown in FIG. 11 embossed sheet of FIGS. 7(*a*) and (7*b*) indicated at 102. Sheet 102 has a plurality of design elements in the form of embossed hexagons 104, 106, 108 and so forth which repeat over the surface of the sheet as shown. Longitudinal undulations are provided at a frequency of about 20 undulations per inch. Interestingly, some of the undulations, such as longitudinal undulations 110 conform to a serpentine shape in the machine direction due to the embossments. This is believed due to the property of relative high cross-direction stretch of the inventive embossed sheets. Thus, the design elements may be continuously embossed shapes such as hexagons.

Figure 12:
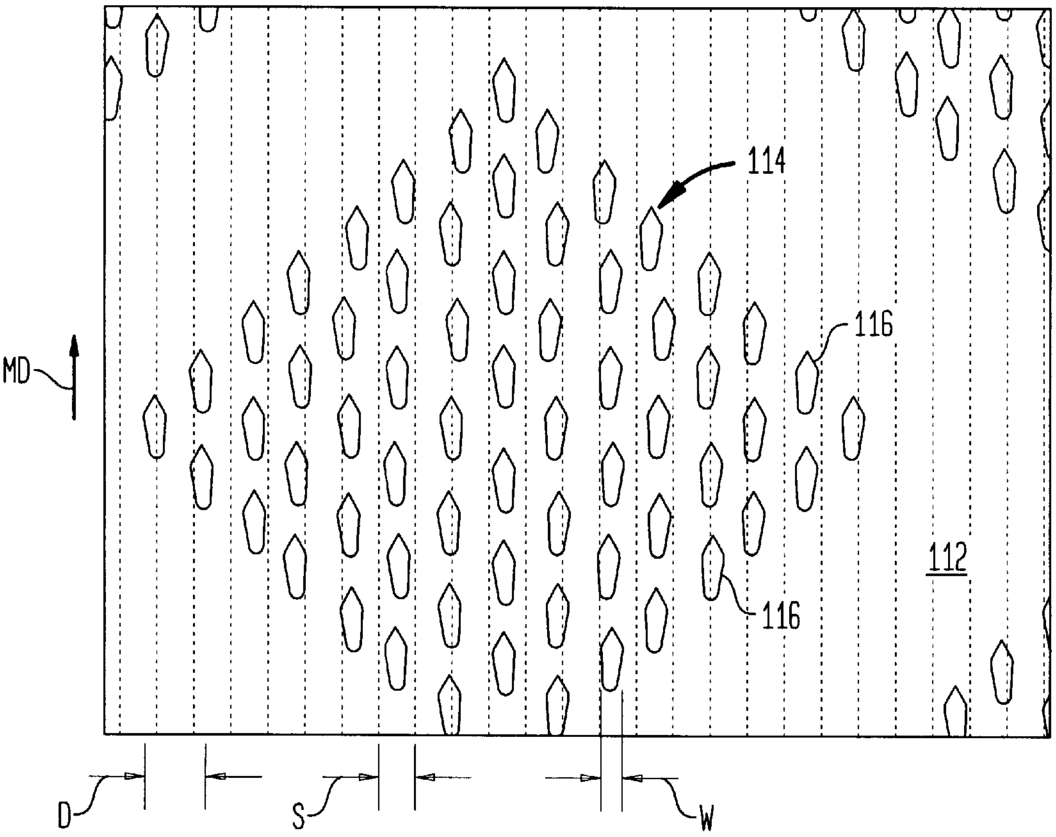
FIG. 12 is a schematic illustration which depicts in detail the embossed sheet of FIGS. 8(*a*) and 8(*b*).

FIG. 12 shows the sheet of FIGS. 8(*a*) and 8(*b*) at 112. Hence, the emboss pattern of the invention is embodied in diamond-like clusters 114 of elongate embossments 116 having a collective aspect ratio of about 1. Individual embossments 116 have an aspect ratio of 1.5 and a width, W, of about 1 mm. The longitudinal undulations are spaced at 20 per inch, thus having a spacing, S, of about 1.3 mm. The individual embossments are spaced at a distance, D, of about 1.4 mm. Thus, the ratio of D:S is about 1 or more.

There is thus provided in accordance with the present invention a single-ply absorbent sheet provided with primary undulations extending along a principal undulatory axis of the sheet, the primary undulations being laterally spaced apart a distance, S, while the single-ply absorbent sheet is provided with an emboss pattern comprising a plurality of design elements wherein up to about 50 percent of the surface area of said absorbent sheet is embossed. The sheet is characterized in that each design element of the emboss pattern has a characteristic emboss element lateral width, W, and a characteristic emboss element, length, L, along a direction L' and wherein the ratio of W:S for each design element is from about 1 to about 4. More typically, the ratio of W:S for each design element is from about 1.5 to about 3, and usually the aspect ratio, L:W for each design element is at least about 1.1. An aspect ratio, L:W for each design element is at least about 1.2 is preferred in some cases, but may be from about 1.1 to about 4, or from about 1.2 to about 2.5.

The direction, L', makes an angle θ of less than about 45 degrees with the principle undulatory axis of the sheet in preferred cases while instances wherein L', makes an angle θ of less than about 30 degrees with the principal undulatory axis of the sheet are preferred. An aspect ratio, L:W for each design element of about 1 is preferred in some embodiments.

In biaxially undulatory embodiments the sheet is provided with secondary undulations substantially perpendicular to the primary undulations such that the secondary undulations extend along a secondary undulatory axis of the sheet. In such cases, the sheet may have from about 10 to about 50 primary undulations per inch extending along the principal undulatory axis and from about 10 to about 150 secondary undulations per inch extending along the secondary undulatory axis of said sheet. In particularly preferred embodiments, the sheet has from about 12 to about 25 primary undulations extending along the principal undulatory axis of the sheet.

Typically, the secondary undulations have a frequency greater than that of said primary undulations and the sheet is a creped sheet wherein the primary undulations extend in the machine direction of the sheet and are longitudinally extending undulations. The sheet may have from about 10 to about 150 crepe bars per inch extending in the cross-direction of the sheet, and may be prepared with an undulatory creping blade operative to form the longitudinally extending undulations. Here, also, the sheet has from about 10 to about 50 longitudinally extending undulations per inch, and more typically, from about 12 to about 25 longitudinally extending undulations per inch. The crepe bars likewise have a frequency greater than that of the longitudinally extending undulations; generally with a frequency of the crepe bars from about 2 to about 6 times the frequency of the longitudinally extending undulations. More typically, the frequency of the crepe bars is from about 2 to about 4 times the frequency of the longitudinally extending undulations. Preferably, the emboss pattern does not substantially alter the cross-direction stretch of the absorbent sheet from which the embossed absorbent sheet was prepared. Preferably, the cross-direction stretch of the sheet is from about 0.2 to about 0.8 times the machine direction stretch of the sheet, whereas a cross-direction stretch of the sheet from about 0.35 to about 0.8 times the machine direction stretch of said sheet is more preferred.

The distance between design elements, D, is greater generally than S, typically from about 1.5 to about 3 times S. The design elements have an emboss depth of from about 15 to about 30 mils in many cases and from about 10 to about 25 percent of the surface area of the sheet is embossed.

The absorbent sheet may be a tissue product having a basis weight of from about 5 to about 25 pounds per 3,000 square foot ream, or a towel product having a basis weight of from about 10 to about 40 pounds per 3,000 square foot ream. In any case, the sheet may be prepared utilizing recycle furnish.

In another aspect of the present invention there is provided a single-ply sheet provided with primary undulations extending along a principal axis of the sheet, the primary undulations is laterally spaced apart a distance, S, and the single-ply absorbent sheet being further provided with an emboss pattern comprising a plurality of embossments of width, W, and length, L, wherein the lengths are along a direction, L', and wherein the embossments cover no more than about fifty percent of the area of said absorbent sheet. The embossments are spaced apart from each other at a distance, D, with the proviso that at least one of the ratios of W:S and D:S is from about 1 to about 4. More typically, at least one of the ratios of W:S and D:S is from about 1.5 to about 3.5, and the embossments cover no more than about 25 percent of the surface area of the sheet. The ratio of cross-direction stretch to machine direction stretch is from about 0.2 to about 0.8, whereas from about 0.35 to about 0.8 is more typical. In preferred embodiments, the principal undulatory axis is along the machine direction of said sheet, and the primary undulations are non-compacted relative to the other portions of the sheet.

In still yet another aspect of the present invention, there is provided a method of making a single-ply absorbent sheet comprising: preparing a web comprising cellulosic furnish; drying the web to form the absorbent sheet; providing the sheet with primary undulations extending along a principal undulatory axis of the absorbent sheet, the undulations being spaced apart a distance, S; and embossing the sheet with an emboss pattern comprising a plurality of design elements wherein up to about 50 percent of the surface area of the sheet is embossed, characterized in that each design element of the emboss pattern has a characteristic emboss element width, W, and a characteristic emboss length, L, along a direction, L', and wherein the ratio of W:S for each design element is from about 1 to about 4. In most cases, the sheet is dried to a consistency of at least 90 percent prior to being embossed; however, the sheet may be embossed at a consistency of less than about 90 percent. The absorbent sheet may be provided with the primary undulations by way of wet shaping the sheet on a fabric at a consistency of between about 30 and about 85 percent. Furthermore, the sheet may be a biaxially undulatory sheet with secondary undulations extending in a direction substantially perpendicular to the principal undulatory axis. In preferred embodiments, the process includes applying the sheet to a Yankee dryer and creping the sheet from the Yankee dryer.

Another method for making a single-ply embossed absorbent sheet in accordance with the present invention comprises: preparing a web comprising cellulosic furnish; applying the web to a Yankee dryer; creping the web from the Yankee dryer with an undulatory creping blade at a consistency of between about 40 and about 98 percent, such that the creped sheet is provided with crepe bars extending laterally in the cross-direction and undulations extending longitudinally in the machine direction, the undulations being spaced apart a distance, S; and embossing the sheet with an emboss pattern comprising a plurality of design elements wherein up to about 50 percent of the surface area of the absorbent sheet is embossed, characterized in that each design element of the emboss pattern has a characteristic emboss element lateral width, W, and a characteristic emboss element, length, L, along a direction, L', and wherein the ratio of W:S for each design element is from about 1 to about 4. Typically, the step of embossing the absorbent sheet comprises passing said sheet through a nip defined by a pair of matched embossing rolls. The matched embossing rolls may be rigid embossing rolls, such as steel rolls, or may include a rigid roll and a yielding roll. A yielding roll may be a rubber embossing roll prepared by laser engraving.

The invention has been described with respect to preferred embodiments. However, as those skilled in the art will recognize, modifications and variations in the specific details which have been described and illustrated may be resorted to without departing from the spirit and scope of the invention as defined in the appended claims.

What is claimed is:

1. A single-ply absorbent sheet provided with primary undulations extending along a principal undulatory axis of said sheet, said primary undulations being laterally spaced apart a distance, S, said single-ply absorbent sheet being provided with an emboss pattern comprising a plurality of design elements wherein up to about 50 percent of the surface area of said absorbent sheet is embossed, characterized in that each design element of said emboss pattern has a characteristic emboss element lateral width, W, and a characteristic emboss element, length, L, along a direction L' and wherein the ratio of W:S for each design element is from about 1 to about 4.

2. The single-ply absorbent sheet according to claim 1, wherein the ratio of W:S for each design element is from about 1.5 to about 3.

3. The single-ply absorbent sheet according to claim 1, wherein the aspect ratio, L:W for each design element is at least about 1.1.

4. The single-ply absorbent sheet according to claim 1, wherein the aspect ratio, L:W for each design element is at least about 1.2.

5. The single-ply absorbent sheet according to claim 1, wherein the aspect ratio, L:W for each design element is from about 1.1 to about 4.

6. The single-ply absorbent sheet according to claim 1, wherein the aspect ratio, L:W for each design element is from about 1.2 to about 2.5.

7. The single-ply absorbent towel according to claim 1, wherein said direction, L', makes an angle θ of less than about 45 degrees with the principal undulatory axis of said sheet.

8. The single-ply absorbent sheet according to claim 7, wherein said direction, L', makes an angle θ of less than about 30 degrees with the principal undulatory axis of said sheet.

9. The single-ply absorbent sheet according to claim 1, wherein the aspect ratio, L:W for each design element is about 1.

10. The single-ply absorbent sheet according to claim 1, wherein said sheet is provided with secondary undulations substantially perpendicular to said primary undulations such that said sheet is a biaxially undulatory sheet with secondary undulations extending along a secondary undulatory axis of said sheet.

11. The single-ply absorbent sheet according to claim 10, wherein said sheet has from about 10 to about 50 primary undulations per inch extending along said principal undulatory axis and from about 10 to about 150 secondary undulations per inch extending along said secondary undulatory axis of said sheet.

12. The single-ply absorbent sheet according to claim 11, wherein said sheet has from about 12 to about 25 primary undulations extending along said principal undulatory axis of said sheet.

13. The single-ply absorbent sheet according to claim 10, wherein said secondary undulations have a frequency greater than that of said primary undulations.

14. The single-ply absorbent sheet according to claim 1, wherein said sheet is a creped sheet and wherein said primary undulations extend in the machine direction of said sheet and are longitudinally extending undulations.

15. The single-ply absorbent sheet according to claim 14, wherein said sheet has from about 10 to about 150 crepe bars per inch extending in the cross-direction of said sheet.

16. The single-ply absorbent sheet according to claim 15, prepared with an undulatory creping blade operative to form said longitudinally extending undulations.

17. The single-ply absorbent sheet according to claim 16, wherein said sheet has from about 10 to about 50 longitudinally extending undulations per inch.

18. The single-ply absorbent sheet according to claim 17, wherein said sheet has from about 12 to about 25 longitudinally extending undulations per inch.

19. The single-ply absorbent sheet according to claim 16, wherein the crepe bars have a frequency greater than that of the longitudinally extending undulations.

20. The single-ply absorbent sheet according to claim 19, wherein the frequency of the crepe bars is from about 2 to about 6 times the frequency of said longitudinally extending undulations.

21. The single-ply absorbent sheet according to claim 20, wherein the frequency of the crepe bars is from about 2 to about 4 times the frequency of said longitudinally extending undulations.

22. The single-ply absorbent sheet according to claim 14, wherein the emboss pattern does not substantially alter the cross-direction stretch of the absorbent sheet from which the embossed absorbent sheet was prepared.

23. The single-ply absorbent sheet according to claim 22, wherein the cross-direction stretch of said sheet is from about 0.2 to about 0.8 times the machine direction stretch of said sheet.

24. The single-ply absorbent sheet according to claim 23, wherein the cross-direction stretch of said sheet is from about 0.35 to about 0.8 times the machine direction stretch of said sheet.

25. The single-ply absorbent sheet according to claim 1, wherein the distance between design elements, D, is greater than S.

26. The single-ply absorbent sheet according to claim 25, wherein D is from about 1.5 to about 3 times S.

27. The single-ply absorbent sheet according to claim 1, wherein said design elements have an emboss depth of from about 15 to about 30 mils.

28. The single-ply absorbent sheet according to claim 1, wherein from about 10 to about 25 percent of the surface area of said sheet is embossed.

29. The single-ply absorbent sheet according to claim 1, wherein said sheet is a tissue product having a basis weight of from about 5 to about 25 pounds per 3,000 square foot ream.

30. The single-ply absorbent sheet according to claim 1, wherein said sheet is a towel product having a basis weight of from about 10 to about 40 pounds per 3,000 square foot ream.

31. The single-ply absorbent sheet according to claim 1 prepared utilizing recycle furnish.

32. A single-ply sheet provided with primary undulations extending along a 5 principal axis of said sheet, said primary undulations being laterally spaced apart a distance, S, said single-ply absorbent sheet being further provided with an emboss pattern comprising a plurality of embossments of width, W, and length, L, wherein the lengths are along a direction, L', and wherein said embossments cover no more than about fifty percent of the area of said absorbent sheet, and wherein further the embossments are spaced apart from each other at a distance, D, with the proviso that at least one of the ratios of W:S and D:S is from about 1 to about 4.

33. The single-ply absorbent sheet according to claim 32, wherein at least one of the ratios of W:S and D:S is from about 1.5 to about 3.5.

34. The single-ply absorbent sheet according to claim 32, wherein said embossments cover no more than about 25 percent of the surface area of said sheet.

35. The single-ply absorbent sheet according to claim 32 wherein the ratio of cross-direction stretch to machine direction stretch is from about 0.2 to about 0.8.

36. The single-ply absorbent sheet according to claim 35, wherein the ratio of the cross-direction stretch to the machine direction stretch is from about 0.35 to about 0.8.

37. The single-ply absorbent sheet according to claim 32, wherein said principal undulatory axis is along the machine direction of said sheet.

38. The single-ply embossed sheet according to claim 32, wherein said primary undulations are non-compacted relative to the other portions of the sheet.

39. A method of making a single-ply absorbent sheet comprising:

preparing a web comprising cellulosic furnish;

drying the web to form said absorbent sheet;

providing said sheet with primary undulations extending along a principal undulatory axis of the absorbent sheet, said undulations being spaced apart a distance, S; and embossing the sheet with an emboss pattern comprising a plurality of design elements wherein up to about 50 percent of the surface area of said sheet is embossed, characterized in that each design element of said emboss pattern has a characteristic emboss element width, W, and a characteristic emboss length, L, along a direction, L', and wherein the ratio of W:S for each design element is from about 1 to about 4.

40. The method according to claim 39, wherein said sheet is dried to a consistency of at least 90 percent prior to being embossed.

41. The method according to claim 39, wherein said sheet is embossed at a consistency of less than about 90 percent.

42. The method according to claim 39, wherein said absorbent sheet is provided with said primary undulations by way of wet shaping said sheet on a fabric.

43. The method according to claim 42, wherein said step of wet shaping said sheet on a fabric is carried out at a consistency of between about 30 and about 85 percent.

44. The method according to claim 39, wherein said sheet is a biaxially undulatory sheet with secondary undulations extending in a direction substantially perpendicular to said principal undulatory axis.

45. The method according to claim 44, wherein said sheet includes applying said sheet to a Yankee dryer and wherein said sheet is creped from said Yankee dryer.

46. The method according to claim 39, wherein the ratio of W:S for each design element is from about 1.5 to about 3.

47. The method according to claim 39, wherein the aspect ratio, L:W for each design element is at least about 1.1.

48. The method according to claim 39, wherein the aspect ratio, L:W for each design element is at least about 1.2.

49. The method according to claim 47, wherein the aspect ratio, L:W for each design element is from about 1.1 to about 4.

50. The method according to claim 39, wherein the aspect ratio, L:W for each design element is from about 1.2 to about 2.5.

51. The method according to claim 39, wherein said direction, L', makes an angle θ of less than about 45 degrees with the machine direction of said sheet.

52. The method according to claim 51, wherein said direction, L', makes an angle θ of less than about 30 degrees with the machine direction of said sheet.

53. The method according to claim 39, wherein the aspect ratio, L:W for each design element is about 1.

54. A method of making a single-ply embossed absorbent sheet comprising:

preparing a web comprising cellulosic furnish;

applying said web to a Yankee dryer;

creping said web from said Yankee dryer with an undulatory creping blade at a consistency of between about 40 and about 98 percent, such that said creped sheet is provided with crepe bars extending laterally in the cross-direction and undulations extending longitudinally in the machine direction, said undulations being spaced apart a distance, S; and embossing said sheet with an emboss pattern comprising a plurality of design elements wherein up to about 50 percent of the surface area of said absorbent sheet is embossed, characterized in that each design element of said emboss pattern has a characteristic emboss element lateral width, W, and a characteristic emboss element, length, L, along a direction L' and wherein the ratio of W:S for each design element is from about 1 to about 4.

55. The method according to claim 54, wherein said step of embossing said absorbent sheet comprises passing said sheet through a nip defined by a pair of matched embossing rolls.

56. The method according to claim 55, wherein said matched embossing rolls are rigid embossing rolls.

57. The method according to claim 56, wherein said rigid embossing rolls are steel embossing rolls.

58. The method according to claim 55, wherein said matched embossing rolls include a rigid roll and a yielding roll.

59. The method according to claim 58, wherein said rigid roll is a steel embossing roll and said yielding embossing roll is a rubber embossing roll.

60. The method according to claim 54, wherein the ratio of W:S for each design element is from about 1.5 to about 3.

61. The method according to claim 54, wherein the aspect ratio, L:W for each design element is at least about 1.1.

62. The method according to claim 54, wherein the aspect ratio, L:W for each design element is at least about 1.2.

63. The method according to claim 61, wherein the aspect ratio, L:W for each design element is from about 1.1 to about 4.

64. The method according to claim 54, wherein the aspect ratio, L:W for each design element is from about 1.2 to about 2.5.

65. The method according to claim 54, wherein said direction, L', makes an angle θ of less than about 45 degrees with the machine direction of said sheet.

66. The method according to claim 65, wherein said direction, L', makes an angle θ of less than about 30 degrees with the machine direction of said sheet.

67. The method according to claim 54, wherein the aspect ratio, L:W for each design element is about 1.

68. The method according to claim 54, wherein said sheet has from about 10 to about 150 crepe bars per inch extending in the cross-direction of said sheet.

69. The method according to claim 68, wherein said sheet has from about 10 to about 50 longitudinally extending undulations per inch.

70. The method according to claim 69, wherein said sheet has from about 12 to about 25 longitudinally extending undulations per inch.

71. The method according to claim 54, wherein the crepe bars have a frequency greater than that of the longitudinally extending undulations.

72. The method according to claim 71, wherein the frequency of the crepe bars is from about 2 to about 6 times the frequency of said longitudinally extending undulations.

73. The method according to claim 72, wherein the frequency of the crepe bars is from about 2 to about 4 times the frequency of said longitudinally extending undulations.

74. The method according to claim 54, wherein the emboss pattern does not substantially alter the cross-direction stretch of the absorbent sheet from which the embossed absorbent sheet was prepared.

75. The method according to claim 54, wherein the cross-direction stretch of said sheet is from about 0.2 to about 0.8 times the machine direction stretch of said sheet.

76. The method according to claim 75, wherein the cross-direction stretch of said sheet is from about 0.35 to about 0.8 times the machine direction stretch of said sheet.

77. The method according to claim 54, wherein the distance between design elements, D, is greater than S.

78. The method according to claim 77, wherein D is from about 1.5 to about 3 times S.

79. The method according to claim 54, wherein said design elements have an emboss depth of from about 15 to about 30 mils.

80. The method according to claim 54, wherein from about 10 to about 25 percent of the surface area of said sheet is embossed.

81. The method according to claim 54, wherein said sheet is a tissue product having a basis weight of from about 5 to about 25 pounds per 3,000 square foot ream.

82. The method according to claim 54, wherein said sheet is a towel product having a basis weight of from about 10 to about 40 pounds per 3,000 square foot ream.

83. The method according to claim 54, wherein said cellulosic furnish comprises recycle furnish.

84. The method according to claim 54, wherein said cellulosic furnish comprises non-cellulosic material.

85. The method according to claim 54, wherein said cellulosic furnish comprises synthetic fiber.

* * * * *